(12) United States Patent
Chambliss et al.

(10) Patent No.: US 9,116,936 B2
(45) Date of Patent: Aug. 25, 2015

(54) INLINE LEARNING-BASED SELECTIVE DEDUPLICATION FOR PRIMARY STORAGE SYSTEMS

(71) Applicant: International Business Machines Corporation, Armonk, NY (US)

(72) Inventors: David D. Chambliss, Morgan Hill, CA (US); Bhushan P. Jain, Jalgaon (IN); Maohua Lu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/911,155

(22) Filed: Jun. 6, 2013

(65) Prior Publication Data

US 2014/0365449 A1    Dec. 11, 2014

(51) Int. Cl.
*G06F 17/30* (2006.01)
*G06F 3/06* (2006.01)

(52) U.S. Cl.
CPC ........ *G06F 17/30303* (2013.01); *G06F 3/0641* (2013.01); *G06F 17/30159* (2013.01)

(58) Field of Classification Search
CPC .......................... G06F 17/30159; G06F 3/0641
USPC ......................................................... 707/692
See application file for complete search history.

(56) References Cited

U.S. PATENT DOCUMENTS

| | | |
|---|---|---|
| 2011/0307683 A1 | 12/2011 | Spackman |
| 2012/0158672 A1 | 6/2012 | Oltean et al. |
| 2012/0226741 A1 | 9/2012 | Tofano |
| 2012/0233135 A1 | 9/2012 | Tofano |
| 2013/0086006 A1* | 4/2013 | Colgrove et al. ............. 707/692 |
| 2013/0151482 A1* | 6/2013 | Tofano ........................... 707/692 |
| 2014/0114932 A1* | 4/2014 | Mallaiah et al. .............. 707/692 |

OTHER PUBLICATIONS

Alvarez, C. "Back to Basics: Deduplication | NetApp Community", Version 13, created by Tech OnTap Editor on Mar. 3, 2011, last modified by Tech OnTap Editor on May 21, 2012, <https://communities.netapp.com/docs/DOC-9949>.

Kim et al., "Deduplication in SSDs: Model and Quantitative Analysis", Symposium on Mass Storage Systems and Technologies (MSST), 2012 IEEE 28th, Apr. 16-20, 2012, Digital Object Identifier: 10.1109/MSST.2012.6232379, Publication Year: 2012, pp. 1-12.

(Continued)

*Primary Examiner* — Jensen Hu
(74) *Attorney, Agent, or Firm* — Jason H. Sosa; Noah A. Sharkan (57) ABSTRACT

A computing device receives a plurality of writes; each write is comprised of chunks of data. The computing device records metrics associated with the deduplication of the chunks of data from the plurality of writes. The computing device generates groups based on associating each group with a portion of a range of the metrics, such that each of the chunks of data are associated with one of the groups, and a similar number of chunks of data are associated with each group. The computing device determines a deduplication affinity for each of the groups based on the chunks of data that are duplicates and at least one metric. The computing device sets a threshold for the deduplication affinity and in response to any of the groups exceeding the threshold, the computing device excluding the chunks of data associated with a group exceeding the threshold, from deduplication.

20 Claims, 5 Drawing Sheets

(56) References Cited

OTHER PUBLICATIONS

"Method and System for Managing Multi-tenency Over Deduplication Technology for a Storage Cloud", IP.com. PriorArtDatabase, Technical Disclosure, IP.com No. IPCOM000210397D, IP.com Electronic Publication: Sep. 2, 2011.

"Product: EMC CLARiiON AX4", Retrieved online: Feb. 10, 2013, © 2013 EMC Corporation, <http://www.emc.com/products/detail/hardware/clariion-ax4.htm>.

"Storage Partitioning and Routing Scheme to Achieve Improved Multi-node Deduplication", IP.com, PriorArtDatabase, Technical Disclosure, IP.com No. IPCOM000217034D, IP.com Electronic Publication: Apr. 27, 2012, © 2012 Symantec Corporation.

Srinivasan et al., "iDedup: Latency-aware, inline data deduplication for primary storage". ACM, FAST'12 Proceedings of the 10th USENIX conference on File and Storage Technologies, pp. 1-14, USENIX Association Berkeley, CA, USA © 2012.

Zhu et al., "Avoiding the Disk Bottleneck in the Data Domain Deduplication File System", FAST '08: 6th USENIX Conference on File and Storage Technologies, pp. 269-282.

* cited by examiner

INLINE LEARNING-BASED SELECTIVE DEDUPLICATION FOR PRIMARY STORAGE SYSTEMS

BACKGROUND

The present invention relates generally to the field of computer data storage, and more particularly to deduplication in primary storage.

Data deduplication refers to detecting and eliminating redundant data in storage systems without affecting the accuracy and integrity of the original data. Deduplication reduces the amount of physical storage requirements of a system and can reduce the amount of data transmitted across a network.

Deduplication can result in significant hardware savings by avoiding the cost of additional storage capacity, reducing or eliminating power consumption by additional storage devices, and removing the cost of additional data management. Deduplication applies to the redundancy of data to be written to storage, and the redundancy ratios for data, such as backup files and email, which can reach very high ratios of duplication.

Deduplication can be performed in two differing modes, inline and off-line. Inline deduplication refers to deduplication processes in which the data is deduplicated as it is received into primary memory and before it is written to disk, as opposed to off-line (also called out-of-line or post-process) deduplication.

Deduplication segments larger blocks of data to be written to storage, into smaller units of data referred to as chunks. A "continuous write" can be a familiar unit of data such as a file, an image, a database table or an email, and is comprised of multiple data chunks. Chunks, usually range in size from 4 KB to 512 KB, corresponding to a logical block address (LBA), which identifies a location in primary storage. A "write" is an operation of storing data to an address within primary or secondary storage. A write to an LBA at a specific time (T1), assigns a chunk of data to the corresponding address of the LBA in primary memory. Similarly a write to secondary or physical storage stores the chunk of data to a corresponding address in a secondary storage device. Therefore each continuous write can correspond to multiple LBAs, and each LBA also corresponds to a physical block address (PBA) by use of an LBA-to-PBA (L2P) mapping index. The PBA identifies a location in secondary storage where the data for the LBA is written to a memory storage device, such as a disk drive of a computing device. A hashing function is performed on the content of the chunk to produce a near-unique fingerprint that is compared to an index of previously stored fingerprint-to-PBA mappings (F2P), to determine if the LBA is a duplicate. The steps of hashing and lookup require significant primary memory and central processing unit (CPU) cycles that can result in unacceptable CPU performance degradation.

Inline deduplication avoids the need to retain a large storage capacity prior to deduplication. However, it places significant demands on primary memory for duplicate lookups, and overall computing performance can be significantly affected by calculating fingerprints to identify duplications for chunks of data awaiting a write operation. Reducing storage requirements by inline deduplication on all data writes comes at a cost and as a result, many implementations perform deduplication "off-line".

Off-line deduplication, in which the data is first written to storage in a disk storage area and during time periods when CPU demands are low, is performed in a batch mode, avoiding unscheduled performance issues. However, the reduced storage benefits of deduplication are not fully realized as large storage areas are still required to hold the written data until deduplication is completed, and many high-utilization systems lack off-line time when deduplication can be performed without impact.

Deduplication policies, defined at the system level, set conditions and priorities for deduplication benefits to be realized. Policies are set based on characteristics of the data, but generally trade off reduction of storage requirements for improved performance.

BRIEF SUMMARY

Embodiments of the present invention disclose a method, computer program product, and system for inline deduplication filtering. In one aspect of the invention, a computing device receives a plurality of writes; each write is comprised of chunks of data. The computing device records metrics associated with the deduplication of the chunks of data from the plurality of writes. The computing device generates groups based on the metrics, each of the chunks of data from the plurality of writes are associated with one of the groups, wherein a different portion of available ranges of the metrics is associated with each of the groups, and each of the groups is associated with a similar number of the chunks of data. The computing device determines a deduplication affinity for each of the groups based on a percentage of the chunks of data that align with each of the groups and a percentage of the chunks of data of each of the groups that are duplicates. The computing device determines a threshold for the deduplication affinity of the groups, and in response to incoming chunks of data aligning with the groups exceeding the threshold for the deduplication affinity, the computing device excluding from deduplication, the incoming chunks of data aligning with the groups exceeding the threshold.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention provide an inline deduplication filtering process for a data processing environment to optimize the benefits of inline deduplication of input write operations, which balances the impact on performance and the requirement of storage, consistent with a chosen deduplication policy. In one embodiment, data input is received and requires a "write" operation, in which data is written to a disk or other long-term tangible storage media. The write history, which includes the frequency of overwrites for a specified amount of data, is recorded over time and metric values are determined that characterize the writes relative to uniqueness and duplication longevity. The distribution of writes with characterizing metrics is distributed into groups or "buckets" defined by metric ranges. The writes are evenly distributed or assigned to the buckets based on the characterizing metric values, and the range of each bucket is adjusted in response to the dynamic processing of writes and to maintain even distribution of writes among the buckets.

Stable bucket range boundaries are achieved with a statistically significant number of writes processed. Threshold values are determined based on characteristic metric values which suggest a low deduplication affinity, and the buckets with range boundaries of characteristic values that violate the threshold values are identified. Thus, groups are associated with having or not having, a low deduplication affinity, predicting the benefit of deduplication with respect to the chosen deduplication policy. Writes and subsequent writes, with characteristic metrics aligned with buckets having low-level benefit of deduplication, are "filtered" to skip deduplication operations. Prediction levels for writes skipping deduplication are continually checked by sampling and evaluating duplication benefit levels. The present invention will now be described in detail with reference to the Figures.

Figure 1:
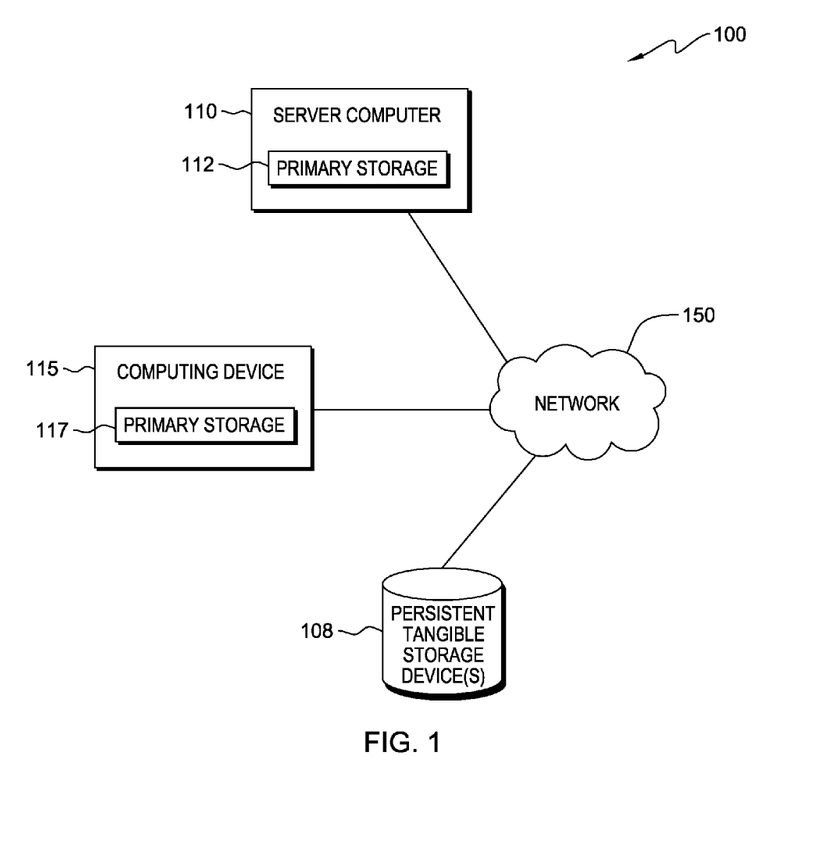
FIG. 1 is an illustrative block diagram of a data processing environment as a network of data processing systems, in accordance with embodiments of the present invention.

FIG. 1 is an illustrative block diagram of a data processing environment as a network of data processing systems, generally designated 100, in accordance with embodiments of the present invention. Data processing environment 100 includes computing devices and components of computing systems, such as server computer 110, computing device 115 and persistent tangible storage device(s) 108, all interconnected via network 150.

Network 150 connects all operational computing devices that transmit and receive data within data processing environment 100. Network 150 can be, for example, a local area network (LAN), a wide area network (WAN), the Internet, a cable network, a fiber optic network, a wireless network or any other network or combinations of networks that connect the computing devices of distributed communications environment 100. In general, network 150 can be any combination of connections and protocols that will support transmitting and receiving data between server computer 110, computing device 115, and persistent tangible storage device(s) 108.

Server computer 110 may be, for example, a server computer system such as a management server, a networked server computer, a web server, or may include a laptop, tablet, or netbook personal computer (PC), a desktop computer, a personal digital assistant (PDA), a smart phone, a mainframe computer. Further, server computer 110 may represent clustered computers and components to act as single pools of seamless resources when accessed through network 150, or can represent one or more cloud computing environments. Server computer 110 includes primary storage 112, which includes volatile random access memory (RAM) and cache memory, which provides faster memory access for processors than accessing secondary storage devices such as persistent tangible storage device(s) 108. In one embodiment, server computer 110 performs inline deduplication filtering using primary memory resources. Server computer 110 is capable of receiving, transmitting, and storing data, and processing programming instructions.

Similarly, computing device 115 is interconnected to server computer 110 and persistent tangible storage device(s) 108 via network 150. Computing device 115 can be, for example, a laptop, a tablet, a netbook personal computer (PC), a desktop computer, a personal digital assistant (PDA), a smart phone, a mainframe computer, or any other computing device capable of receiving, storing, and transmitting data, and processing programming instructions. Computing device includes primary storage 117, which includes volatile random access memory (RAM) and cache memory, and provides faster memory access for processors than accessing secondary storage devices such as persistent tangible storage device(s) 108. In one embodiment, computing device 115 performs inline deduplication filtering using primary storage resources.

Persistent tangible storage device(s) 108 is capable of storing computer-readable programming instructions, computer-readable data and computer-readable metadata on a tangible computer-readable storage medium. Persistent tangible storage device(s) 108 can be a magnetic disk storage device of an internal hard drive, a semiconductor storage device such as erasable programmable read only memory (EPROM), flash memory or any other computer-readable tangible storage device that can store a computer program and digital information.

Persistent tangible storage device(s) 108 can be a component of server computer 110 or computing device 115, or alternatively, persistent tangible storage device(s) 108 can be network accessible via network 150, by server computer 110 or computing device 115. As a secondary storage device, the computer-readable instructions, data, and metadata, which have been written to persistent tangible storage device(s) 108, are retained after power-down, making persistent tangible storage device(s) 108 a non-volatile computer-readable storage medium.

Computing devices, such as computing device 115 and server computer 110 operate with a policy defining the behavior of the computing device in storing duplicate data. Policies define the level of preference to reduce storage capacity requirements at the expense of reducing the level of computing performance. Deduplication is a process performed by a computing device in which duplicate data is identified and substituted by a memory pointer to the original stored content, reducing the physical storage volume that the duplicate data would require. Deduplication can be performed on either of the computing devices of FIG. 1. In most instances, deduplication is performed off-line or out-of-line, in which the data is written to secondary storage and then processed through deduplication at a later time. This offers reduced benefit levels of storage volume reduction since increased storage volume is required to initially write the data to storage before deduplication is performed at a later time. In addition, dedicated deduplication process time must be scheduled during which CPU performance for other operations will be significantly affected. Since all data processed through deduplication may not result in a benefit of storage volume reduction, the ideal benefit would involve inline deduplication, in which a filtering process exempts data from the deduplication process based on learned characteristics that indicate a low level of benefit would result from deduplication.

Figure 2:
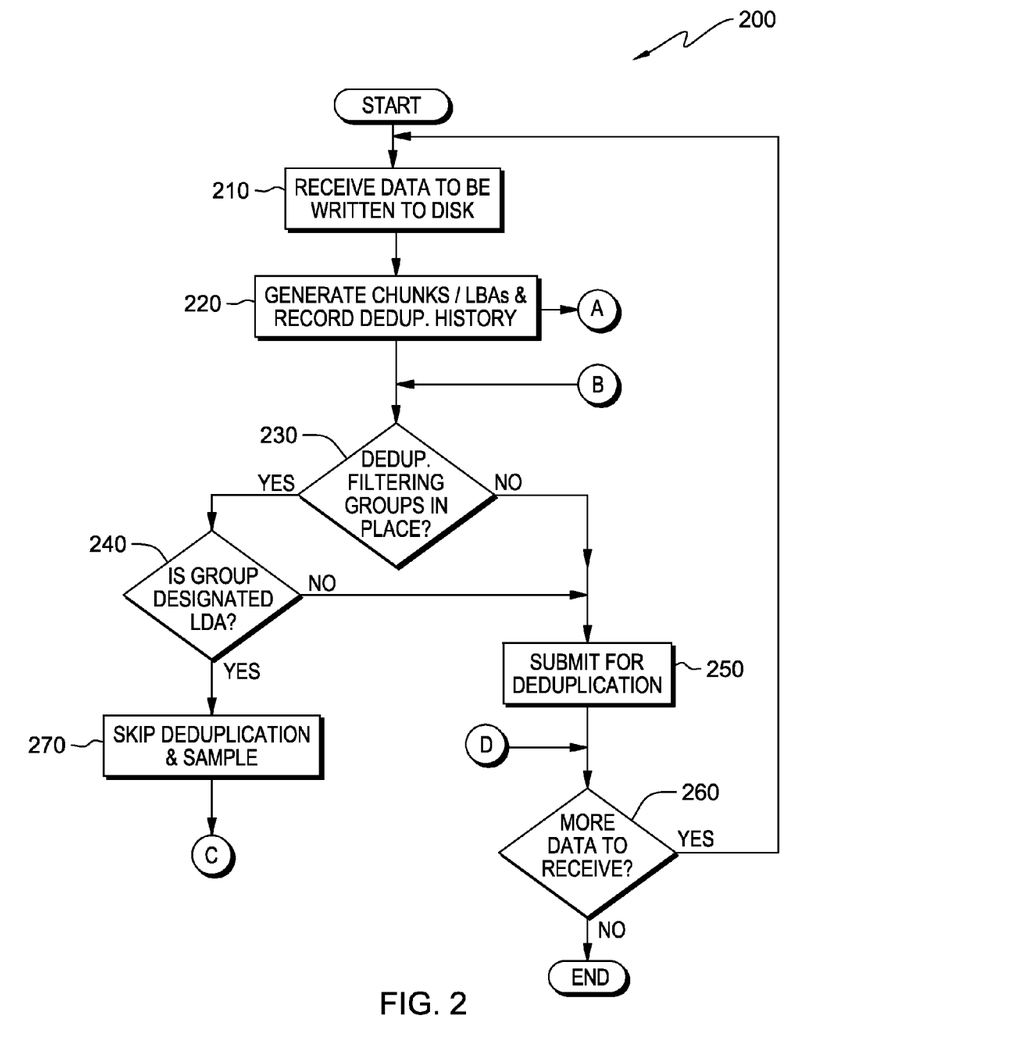
FIG. 2 is a flowchart depicting an overall inline filtering process for deduplication, in accordance with embodiments of the present invention.

FIG. 2 is a flowchart depicting an overall inline filtering process for deduplication, in accordance with embodiments of the present invention, as performed by filtering program 200. Additional details of the operational activities from (A) to (B) in FIG. 2 are discussed and presented in regards to FIG. 3. Details of operational activities from (C) to (D) in FIG. 2, are discussed and presented in FIG. 4. To facilitate the reader's understanding of the inline deduplication filtering process, discussion of inline deduplication filtering operational activities will shift from FIG. 2 to FIG. 3 or 4, to present the detail of the corresponding steps of FIG. 2 and present the inline deduplication filtering process in a logical progression.

Filtering program 200 is an inline deduplication filtering program, operating on a computing device, for example, server computer 110 or computing device 115, and performs an inline deduplication filtering process based on a user-chosen policy specifying the conservation level of computer-readable data storage, and the amount of CPU and input-output (I/O) performance degradation to accept. Filtering program 200 receives data to be written to disk storage or a secondary storage device (step 210). For example, filtering program 200 receives a data file from a download obtained through network 150 that is designated to write to a download folder on a secondary storage device, such as persistent tangible storage device(s) 108.

Filtering program 200 generates data chunks and LBAs from the received data, and records the deduplication history of the LBAs (step 220). In one embodiment, data to be written to storage is segmented into 4 KB pieces or chunks, each chunk is associated with an LBA also referred to as a "write" of the chunk to an LBA. In another embodiment, the LBA size may be larger or vary in size consistent with the desired benefits of the implementation. Each chunk of data is identified by its corresponding LBA, which is a logical memory address, however, for consistency and brevity, the subsequent use of the term LBA is recognized to refer to the chunk of data written to the corresponding LBA. The deduplication history of an LBA includes overwrites, whether the LBA is a duplicate, and information associated with the size of the continuous write of the received data of which the LBA is a part. Filtering program 200 creates data structures, maintained in primary storage, to store the deduplication history information, and uses the deduplication history to generate metrics that are associated with the LBA. The metrics are used to predict which subsequent LBAs will produce low benefit from deduplication.

For example, filtering program 200 receives a 1 mega-byte (MB) sized continuous write to store to disk and segments the received continuous write into 256 chunks of 4 kilo-bytes (KBs). Filtering program 200 associates each chunk to an LBA and determines the metrics associated with each LBA.

Filtering program 200 generates two data structures in primary memory that are used to record the information associated with the history of each LBA processed through deduplication. One data structure (D1) records a pair of characteristic metrics for each LBA and whether the LBA is a duplicate, referencing a logical block address-to-physical block address index (L2P), in which duplicate LBAs are indicated and recorded with respect to the physical block address (PBA). One characteristic metric is a score of the absolute count of overwrites, which occurs when a LBA has been previously written to secondary storage, and is written to secondary storage one or more subsequent times. The deduplication process updates a logical-to-physical (L2P) index that maps a logical block address (LBA) in primary storage, to a physical block address (PBA) in secondary storage. The deduplication process also updates a fingerprint-to-PBA (F2P) table used in the deduplication process to identify a duplicate chunk of data, as identified by a hash fingerprint.

The other characteristic metric is the absolute sequentiality score, which is based on the size of the continuous range of the write as received, before it is segmented into LBAs of defined size. For a 1 MB continuous range of a write, and a LBA size of 4 KB, the absolute sequentiality score would be 256, because there are 256 instances of 4 KB LBAs making up the 1 MB continuous range of the write. In one embodiment D1 records the size from the continuous write and the count of overwrites, whereas in another embodiment D1 records the size of the write and a frequency of overwrites, which includes a count of overwrites within a predefined timeframe. The metrics recorded in D1 indicate a measure of the stability and longevity of the data identified by the LBA.

Filtering program 200 requires the recording of a statistically significant amount of LBAs processed through deduplication to establish patterns of behavior associated with the duplication and the storage of data. Establishing data patterns of behavior enables filtering program 200 to predict whether chunks of data associated with LBAs having certain characterizing metrics, will offer low benefit from deduplication and should be exempted or by-pass deduplication. When sufficient deduplication history that includes characterizing metric values has been recorded, filtering program 200 enables inline deduplication filtering.

For an inline deduplication filtering process with D1 in primary storage, the computing system requires a logical block address-to-physical block address (L2P) remapping table to allow for data deduplication by connecting logical addresses in primary storage to physical addresses in secondary storage. In one embodiment, D1 can be implemented as a sub-entry in the L2P remapping table, with the counter updated (add 1 to count) each time the LBA is overwritten. The second data structure (D2) records a mapping of the absolute scores of characteristic metrics of the deduplication history of an LBA, to an abstract score, such as a percentage of total overwrites for the overwrite metric. D2 will be discussed further with respect to FIG. 3. Filtering program 200 records the overwrite scores and sequentiality scores associated with each LBA, to D1, and records whether an LBA is a duplicate. Filtering program 200 then calls grouping module 300 (A), a module component of filtering program 200, which is discussed with regard to FIG. 3.

Figure 3:
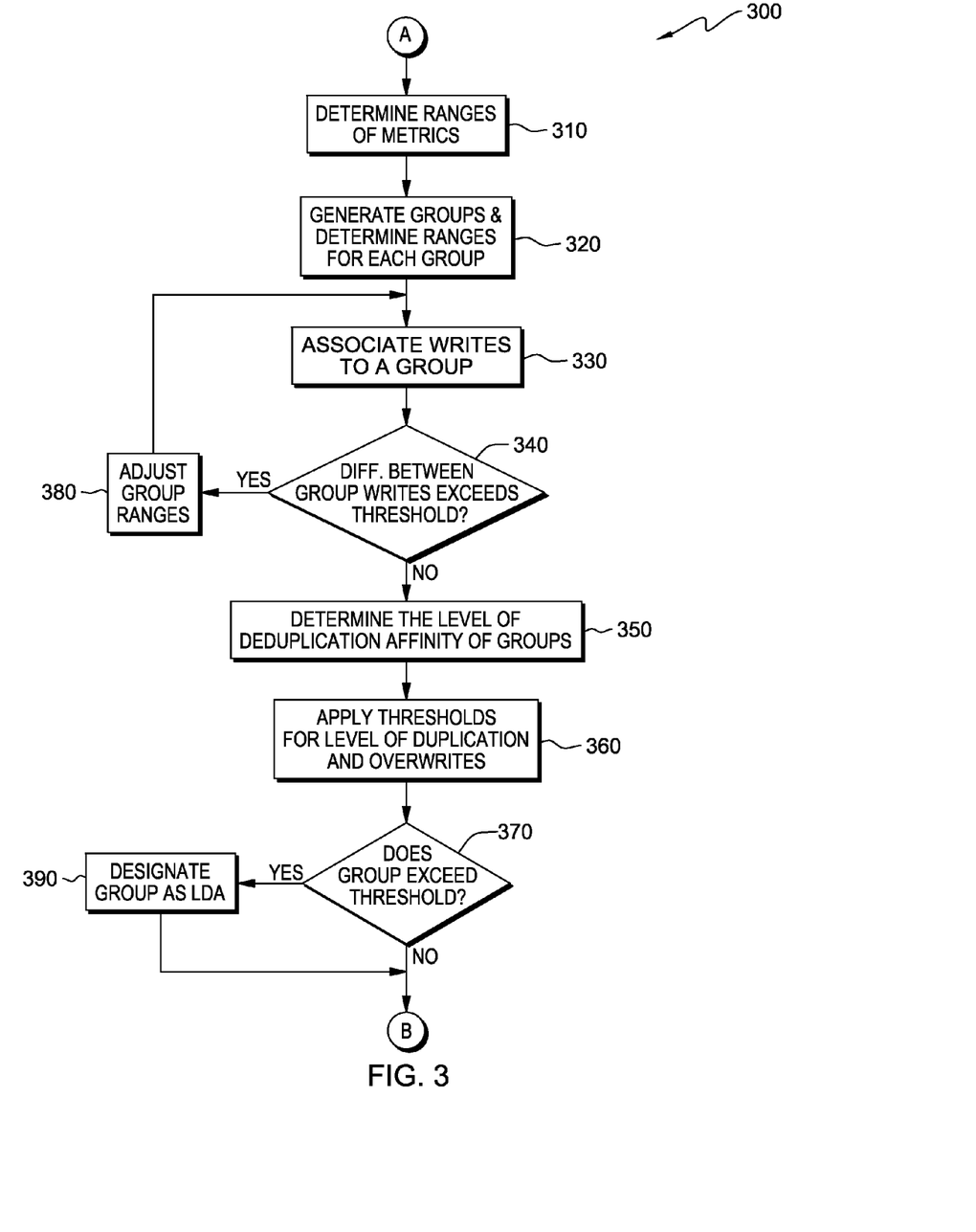
FIG. 3 is a flowchart depicting details of grouping writes and determining low-deduplication affinity groups, in accordance with embodiments of the present invention.

FIG. 3 is a flowchart depicting details of grouping writes to LBAs and determining low-deduplication affinity groups, in accordance with embodiments of the present invention. Grouping module 300 accesses the recorded characterizing metrics of overwrite scores and sequentiality scores for each LBA processed through deduplication, and determines the ranges of the characterizing metrics (step 310). For example, grouping module 300 accesses the characterizing metrics stored in primary memory in data structure D1, and obtains the overwrite count and the quotient of the continuous memory size of the original write, divided by the size of the LBA (sequentiality score), for each LBA processed through deduplication. The absolute scores for the characterizing metrics for the LBAs are converted to abstract scores, by determining the corresponding percentile of the absolute score for each metric. Grouping module 300 determines the range of the abstract scores for each of the characterizing metrics. As deduplication of LBAs continues, grouping module 300 continues to adjust the range for each of the characterizing metric scores.

Grouping module 300 generates groups for the LBAs and determines the ranges for each group, (step 320), comprised of a portion of the range for each metric applied to each group. A different portion of the range of abstract overwrite scores and a portion of the range of abstract sequentiality scores is associated with each group, such that the combination of the group range portions is continuous and includes the entire range of the metrics. The number of groups and the portion of ranges associated with each group are formed in a manner that results in a similar number of LBAs associated with each group. In one embodiment of the present invention, grouping module 300 initially forms two groups, and adds additional groups when a predefined number of LBAs for each group has been exceeded. In a preferred embodiment, abstract scores of 1 through 10 corresponding to percentiles of the absolute overwrite scores, are assigned to groups generated by grouping module 300. Similarly, abstract scores 1 through 10 are assigned to groups for sequentiality absolute scores. Each group is associated with an abstract score corresponding to a portion of the range for each of the characterizing metric scores. Abstract score 1 through 10 for overwrites and abstract scores 1 through 10 for sequentiality, combine to defining a space of 100 abstract units (10×10). The abstract scores associated with a group are stored in D2 in primary memory and used as reference to associate LBAs to groups.

For example, grouping module 300 determines that there are 1000 LBAs that have been processed through deduplication, and accesses the characteristic metric scores for each LBA from D1. Grouping module 300 determines that the range of sequentiality of the 1000 LBAs is 128 KB to 1 MB in units of 128 KB, and determines the range of overwrites to be from 0 to 30. In this simplified example, grouping module 300 forms 4 groups by determining four sets of ranges that include equivalent numbers of LBAs. Group 1 is determined by grouping module 300 to have a sequentiality range from 0 to 384 KB, and overwrite range from 0 to 20, and includes 251 LBAs that have characterizing scores that fall within these ranges. Group 2 is determined to have a sequentiality range from 512 to 1024 KB (or 1 MB), and an overwrite range from 0 to 12, and includes 249 LBAs. Group 3 is determined to have a sequentiality range from 640 KB to 1024 KB and an overwrite range from 13 to 30, and includes 252 LBAs, and group 4 has a sequentiality range from 0 to 512 KB and an overwrite range from 21 to 30, also with 248 LBAs.

In other embodiments, additional characterizing metrics, such as a read/write ratio for the LBA, for example, may be included, producing a three dimensional space to be divided into groups by grouping module 300. A read/write ratio would be the quotient of the number of times an LBA is read from secondary storage and the number of times the LBA is written to secondary storage.

Based on the recorded characterizing metrics converted to abstract scores, grouping module 300 associates writes (writes to an LBA), with a group (step 330). For example, grouping module 300 uses the abstract characterizing metric scores recorded for each LBA and references the data structure D2 to determine which group has the abstract scores corresponding to the abstract characterizing metric scores for the LBA and thus associates each LBA with a group.

The portions of metric ranges for groups are associated with groups to maintain a similar number of LBAs across all groups. The second data structure (D2), maintained in primary storage, is used to record the mapping of absolute scores to abstract scores, enabling filtering program 200 to determine with which group the LBA is associated. Grouping module 300 determines if the difference between group writes (writes to an LBA) exceeds a threshold, and determining that the threshold has been exceeded (step 340, "yes" branch), grouping module 300 proceeds to adjust the group ranges (step 380). Adjusting ranges of the groups includes adjusting the association of the LBAs with the groups to re-establish a similar number of LBAs across all groups. In one embodiment of the present invention, a 10% threshold, representing the difference in the number of LBAs associated with neighboring groups, is used. In other embodiments, a different threshold, greater than 10% or less than 10% may be used to optimize the implementation.

For example, a threshold setting of 10% is used by grouping module 300 for a tolerance of LBA number differences between two neighboring groups. Grouping module 300 determines that the two neighboring groups, group 1 and group 2, have 100 and 120 LBAs associated with them, respectively. Grouping module 300 determines the percentage difference between the neighboring groups by calculating the quotient of the difference (120−100), and the larger number of LBAs associated with either group (120); (20/120=16.7%). Determining that the 10% threshold is exceeded, grouping module 300 proceeds to adjust the ranges of the groups. For example, grouping module 300 expands the range of overwrites for group 1 and simultaneously reduces the range of overwrites for group 2, such that the adjusted range associates 108 LBAs for group 1 and 112 LBAs for group 2, well within the 10% threshold. After adjusting the ranges of the two neighboring groups, grouping module 300 may adjust ranges of other groups to establish an equivalent distribution of LBAs associated with each group.

Grouping module 300 continues to associate LBAs to groups with an adjusted range that aligns with the characterizing metrics of the LBA (loop to step 330). If grouping module 300 determines that the difference of LBAs associated with neighboring groups does not exceed the threshold (step 340, "NO" branch), grouping module 300 proceeds to determine group deduplication affinities.

Having established groups and adjusted the ranges of groups when thresholds for the differences of the number of writes between boundary groups are exceeded, grouping module 300 determines the level of deduplication affinity of each group (step 350). The level of deduplication affinity includes determining the level of duplication for the writes to LBAs within a group. Duplication is an indication of the benefit that may result from deduplication. LBAs associated with groups that have a low level of duplication are more likely to return a low level of benefit if processed through deduplication. Grouping module 300 accesses the duplication data for the LBAs of each group and determines a level of duplication (LOD), by calculating the difference between the number of LBAs associated with the group (as a percentile of the total number of LBAs of all the groups) and two times the number of duplicate LBAs, (for a group: LOD=% of writes to LBAs−2*% of duplicate LBAs). The LOD is calculated using a percentage, such as the percentage of total LBAs associated with the group and the percentage of total duplicate LBAs that are associated with the group.

Having associated LBAs with a group and each group including a similar statistically significant number of LBAs, grouping module 300 applies thresholds for the LOD and overwrites, to all the groups (step 360). In one embodiment, the thresholds are set by grouping module 300 determining the affinity of deduplication for each of the groups, and selecting a threshold such that the volume of LBAs submitted to deduplication will align with the deduplication policy set for the system. In another embodiment, the thresholds may be dynamically adjusted to maintain a stable volume of LBAs that are submitted to deduplication. Additionally, the affinity of deduplication for each group includes determining the overwrite percentage of the LBAs within a group. The overwrite percentage is determined by a quotient of the total LBAs of the group having overwrites and the total LBAs of the group, times 100.

Deduplication policies are chosen (typically by a user-interactive selection) to prioritize the conservation of storage volume, which would set threshold values that send more LBAs through deduplication, or prioritizing performance of applications running on the computing device, such as server computer 110, which would set threshold values that would send fewer LBAs through deduplication. After determining the affinity of each group, and determining a threshold value that aligns with the deduplication policy, grouping module 300 applies the threshold to each group. For example, in one embodiment, grouping module 300 determines the deduplication policy of the system to prioritize conservation of storage volume and sets threshold levels that reduce the volume of data that skips or by-passes deduplication.

Grouping module 300 determines if the groups exceed a threshold for the level of duplication or the level of overwrites, and determining that a group does exceed the threshold (step 370, "yes" branch), grouping module 300 proceeds to designate the group exceeding the threshold as a low deduplication affinity (LDA) group (step 390). The LBAs associated with a group that has been designated as LDA is predicted to produce low levels of storage volume benefit from deduplication, whereas LBAs associated with groups that are not designated as LDA are predicted to produce larger benefits from deduplication. After designating groups exceeding thresholds as LDA, grouping module 300 ends (B), and returns control to filtering program 200 (B), continuing in FIG. 2.

Determining that the groups do not exceed a threshold for the level of duplication or the level of overwrites (FIG. 3, step 370, "no" branch), grouping module 300 does not designate groups as LDA, grouping module 300 ends, and turns control over to filtering program 200 (B), continuing in FIG. 2.

Returning to FIG. 2 (B), filtering program 200 assesses whether adequate deduplication history has been recorded to put deduplication filtering groups in place, and determining that the deduplication filtering groups are not in place (step 230, "No" branch), filtering program proceeds to submit all LBAs for deduplication (step 250). If the number of LBAs processed to obtain deduplication history information is inadequate to establish groups with abstract metric scores and associate a statistically significant uniform number of LBAs among the groups, filtering program 200 submits LBAs for deduplication and no inline deduplication filtering is done.

Determining that groups have been generated and portions of metric ranges associated with groups, filtering program 200 determines that deduplication filtering groups are in place (step 230, "Yes" branch), and determines if an LBA processed through inline deduplication filtering is associated with a group designated as LDA. In one embodiment, determination of deduplication filtering groups being "in place" includes processing deduplication history of a predetermined amount of writes to LBA through deduplication. In another embodiment, an initial iteration of a "write to storage" transaction that may be repeated, such as a backup transaction, is performed to establish and confirm deduplication filtering groups to be in place.

If filtering program 200 determines that the group to which the LBA is associated is not designated as LDA (step 240, "No" branch), the LBA is submitted for deduplication to obtain the benefits of reducing storage requirements (step 250), after which filtering program 200 determines that there is more data to receive with instructions to be written to disk (step 260, "Yes" branch), and filtering program 200 loops to receive data to be written to disk (step 210), and filtering program 200 proceeds as described above. For example, filtering program 200 determines an abstract score for the LBA which is associated with a group that is not designated as LDA, indicating that benefits will result from processing the LBA through deduplication. The LBA is submitted to deduplication after which filtering program 200 determines if there are more data chunks with instructions requiring the chunks to be written to disk.

Determining that the LBA is associated with a group designated as LDA (step 240, "Yes" branch), filtering program 200 submits the LBAs to skip the deduplication and the chunks of data associated with the LBAs are sampled (step 270). Skipping deduplication, the chunk of data is written to disk and a sampling is performed to confirm the decision to skip deduplication, with applicable updates made to the L2P index. Sampling is done at a low level, for example, one to three percent of LBAs associated with a group designated as LDA. Filtering program 200 tracks the number of LBAs filtered for deduplication and calls sampling module 400 (C), to perform sampling, continued in FIG. 4.

For example, with deduplication filtering groups in place, filtering program 200, having received data to be written to disk and obtaining characterizing metrics for the LBA associated with a chunk of the data, determines if the LBA is associated with a group that has been designated as having low deduplication affinity (LDA). If the LBA is associated with a group designated as LDA, filtering program 200 submits the LBA to skip deduplication, because the characteristics of the group the LBA is associated with has a level of duplication or a frequency of being overwritten that lowers the benefit that can be achieved by deduplication. Filtering program 200 updates the L2P index to indicate the location of the write to disk of the data associated with the LBA, and tracks the LBAs that skip deduplication for sampling.

Figure 4:
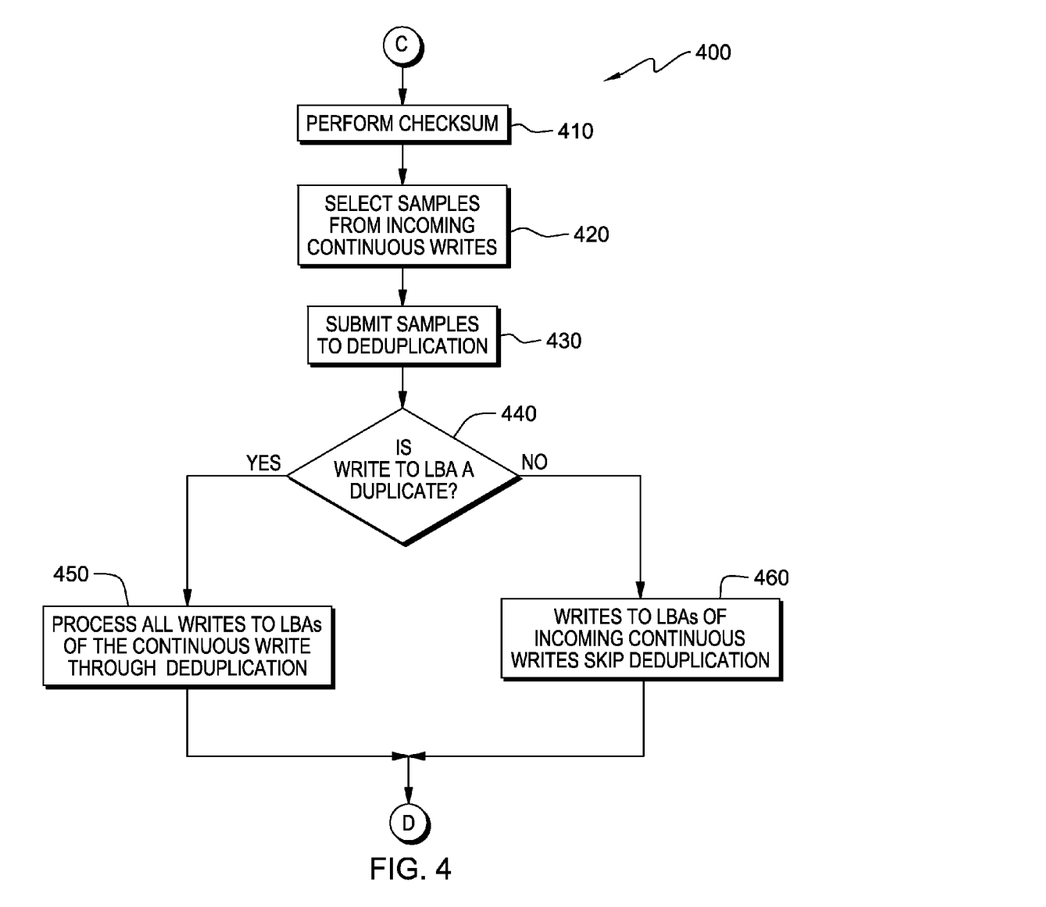
FIG. 4 is a flowchart depicting a sampling component of an inline filtering process for deduplication, in accordance with embodiments of the present invention.

FIG. 4 is a flowchart depicting a sampling component of an inline filtering process for deduplication, in accordance with embodiments of the present invention. For an LDA group, sampling module 400 performs a checksum on the LBAs (step 410). Checksums are used for simple error detection, resulting in a number associated with the bits of the LBA and requiring significantly less CPU steps than performing a hash function on the LBA to produce a fingerprint for deduplication.

Sampling module 400 selects samples from incoming continuous writes associated with LDA groups (step 420). In one embodiment sampling module 400 selects LBAs with a checksum resulting in a particular number pattern, for example, the last "n" digits are zeros. For example, sampling module 400 searches the checksums of the LBAs for a group designated as LDA, and identifies the checksums that have a number pattern in which the last 5 digits of the checksum are all zeros, and selects these LBAs for sampling to verify the prediction of the group as offering low deduplication benefit.

Sample module 400 submits the selected sample LBAs to the deduplication process (step 430). Each sample LBA processed through deduplication has a fingerprint hash function performed and the resulting fingerprint is compared to an index of fingerprints that are mapped to a PBA. If there is a match, the deduplication process identifies the sample fingerprint as a duplicate of a previously recorded fingerprint in the index. For example, sample module 400 selects an LBA whose checksum has zeros for the last 5 digits and submits the LBA to deduplication. A fingerprint hash of the LBA is performed and compared to an index of fingerprints previously written to secondary storage.

If sample module 400 determines that the sampled LBA (write to an LBA), is a duplicate (step 440, "yes" branch), sample module 400 processes all LBAs (writes to LBAs) of the continuous write through deduplication (step 450), because the decision to skip deduplication is regarded as wrong. Processing the LBAs through deduplication attempts to improve the deduplication efficiency, because the duplicate found in the sample indicates storage benefit can be realized by the deduplication process. When the LBAs of the continuous write associated with the LBA determined to be a duplicate are submitted to the deduplication process, sampling module 400 returns control to filtering program 200, and ends (D).

If sample module 400 determines that the sample LBA fingerprint is not a duplicate, then the LBAs of the incoming continuous writes skip deduplication (step 460), and sample module 400 returns control to filtering program 200, and ends (D).

Returning to FIG. 2, (D), filtering program 200 determines that there is more data to receive that includes instructions to write the data to disk (step 260, "Yes" branch), and loops to receive data to be written to disk (step 210), and filtering program 200 proceeds as described above.

If filtering program 200 determines that there is no more data to receive that includes instructions to write the data to disk (step 260, "No" branch), filtering program 200 ends.

Figure 5:
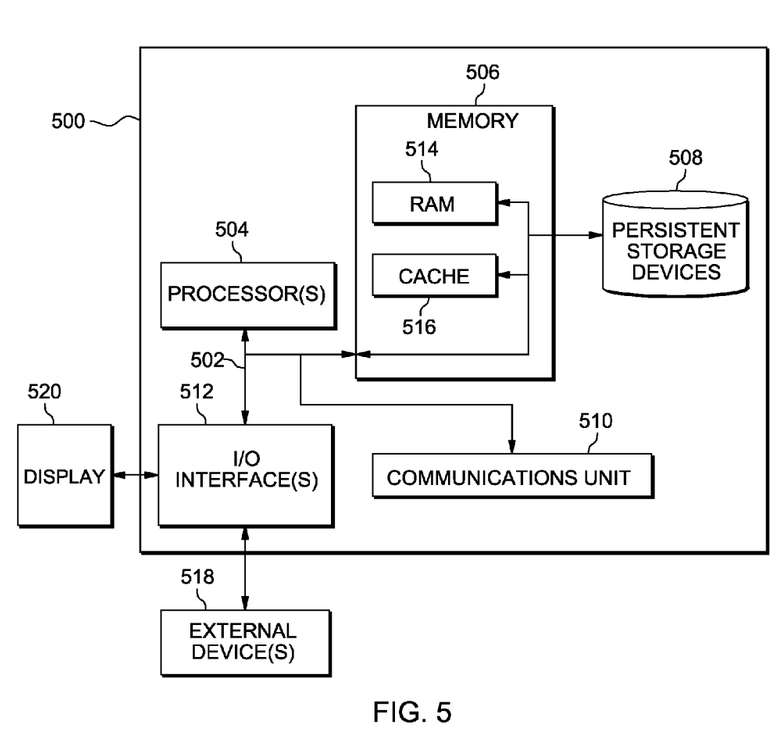
FIG. 5 depicts a block diagram of components of a computing device in which illustrative embodiments of the present invention may be implemented.

FIG. 5 depicts a block diagram of components of a data processing system in which illustrative embodiments of the present invention may be implemented. Data processing system 500 can be a laptop computer, a desktop computer, a server computer, such as server computer 110, a mainframe computer, a computing device, such as computing device 115, or a combination of computing devices, on which inline deduplication filtering can operate in accordance with illustrative embodiments of the present invention.

It should be appreciated that FIG. 5 provides only an illustration of one implementation and does not imply any limitations with regard to the environments in which different embodiments may be implemented. Many modifications to the depicted environment may be made. For example, data processing system 500 may comprise such components spread through multiple systems and resources and may provide systems and resources beyond what is necessary to operate embodiments of the present invention.

Data processing system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Filtering program 200, group module 300 and sample module 400, are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources accessible via network 150, such as data processing system 500 and persistent tangible storage device(s) 508. In these examples, communications unit 510 includes one or more network interface cards. Communications unit 510 may provide communications through the use of either or both physical and wireless communications links. Filtering program 200, grouping module 300 and sampling module 400, may be downloaded to persistent storage 508 through communications unit 510.

I/O interface(s) 512 allows for input and output of data with other devices that may be connected to server computer 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Filtering program 200, grouping module 300 and sampling module 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for inline deduplication filtering, the method comprising:
   receiving a plurality of writes, each write comprised of chunks of data;
   recording metrics associated with the chunks of data from the plurality of writes;
   generating groups based on the metrics, each of the chunks of data from the plurality of writes are associated with one of the groups, wherein a different portion of available ranges of the metrics is associated with each of the groups and each of the groups includes a similar number of the chunks of data;
   determining a deduplication affinity for each of the groups based on a percentage of the chunks of data that align with each of the groups and a percentage of the chunks of data of each of the groups that are duplicates;
   determining a threshold for the deduplication affinity of the groups; and
   in response to incoming chunks of data aligning with the groups that exceed the threshold for the deduplication affinity, excluding from deduplication the incoming chunks of data aligning with the groups that exceed the threshold.

2. The method of claim 1, wherein recording metrics associated with the chunks of data from the plurality of writes comprises recording an absolute overwrite score and recording an absolute sequentiality score, for each of the chunks of data from the plurality of writes.

3. The method of claim 2, wherein the absolute overwrite score and the absolute sequentiality score are converted to an abstract overwrite score and an abstract sequentiality score, respectively, based on a percentile of all the chunks of data from the plurality of writes having the absolute overwrite score and the absolute sequentiality score, and aligning the percentile to a group such that each group is associated with a similar number of chunks of data.

4. The method of claim 1, wherein generating the groups based on metrics comprises:
   performing deduplication on a statistically significant number of chunks of data to obtain a plurality of metric values;
   converting the plurality of metric values of the chunks of data to abstract values based on computing a percentage of the plurality of metric values and a total number of written chunks of data; and
   defining boundaries of the groups, wherein the boundaries are portions of a range of the abstract values and are associated with each of the groups, such that a similar number of chunks of data are associated with each of the groups.

5. The method of claim 4, wherein generating the groups based on metrics further comprises:
- defining the boundaries that are between neighboring groups, wherein the boundaries of a group are continuous with the boundaries of the neighboring groups;
- associating each of the chunks of data including abstract metric scores, to one of the groups based on the abstract metric scores of each of the chunks of data falling within the boundaries of one of the groups;
- setting a threshold for a difference between the number of the written chunks of data that are associated with a group, and the number of the written chunks of data associated with the neighboring groups;
- determining if the threshold for the difference between the number of chunks of data associated with a group and the number of chunks of data associated with the neighboring groups is exceeded; and
- in response to determining that the threshold is exceeded, adjusting the boundaries of the groups, wherein each of the groups is associated with a similar number of the chunks of data.

6. The method of claim 1, wherein recorded metrics and converted absolute metrics to abstract metrics are retained in primary storage within a data structure.

7. The method of claim 1, further comprising:
- selecting a sample from the chunks of data associated with a group having a low affinity of deduplication;
- determining if the sample from the chunks of data is a duplicate; and
- in response to determining the sample from the chunks of data is a duplicate, sending all the chunks of data associated with incoming writes of the sample, through deduplication.

8. A computer program product for inline deduplication filtering, the computer program product comprising a computer-readable storage medium having program code embodied therewith, the program code readable/executable by a computer processor to:
- receive a plurality of writes, each write comprised of chunks of data;
- record metrics associated with the chunks of data from the plurality of writes;
- generate groups based on the metrics, each of the chunks of data from the plurality of writes are associated with one of the groups, wherein a different portion of available ranges of the metrics is associated with each of the groups and each of the groups includes a similar number of the chunks of data;
- determine a deduplication affinity for each of the groups based on a percentage of the chunks of data that align with each of the groups and a percentage of the chunks of data of each of the groups that are duplicates;
- determine a threshold for the deduplication affinity of the groups; and
- in response to incoming chunks of data aligning with the groups that exceed the threshold for the deduplication affinity, exclude from deduplication, by one or more processors, the incoming chunks of data aligning with the groups that exceed the threshold.

9. The computer program product of claim 8, wherein recording metrics associated with the chunks of data from the plurality of writes comprises recording an absolute overwrite score and recording an absolute sequentiality score, for each of the chunks of data from the plurality of writes.

10. The computer program product of claim 9, wherein the absolute overwrite score and the absolute sequentiality score are converted to an abstract overwrite score and an abstract sequentiality score, respectively, based on a percentile of all the chunks of data from the plurality of writes having the absolute overwrite score and the absolute sequentiality score, and aligning the percentile to a group such that each group is associated with a similar number of chunks of data.

11. The computer program product of claim 8, wherein to generate groups based on metrics comprises the program code being readable/executable by a computer processor to:
- perform deduplication on a statistically significant number of chunks of data to obtain a plurality of metric values;
- convert the plurality of metric values of the chunks of data to abstract values based on computing a percentage of the plurality of metric values and a total number of written chunks of data; and
- define boundaries of the groups, wherein the boundaries are portions of a range of the abstract values and are associated with each of the groups, such that a similar number of chunks of data are associated with each of the groups.

12. The computer program product of claim 11, wherein to generate groups based on metrics comprises the program code further being readable/executable by a computer processor to:
- define the boundaries that are between neighboring groups, wherein the boundaries of a group are continuous with the boundaries of the neighboring groups;
- associate each of the chunks of data including abstract metric scores, to one of the groups based on the abstract metric scores of each of the chunks of data falling within the boundaries of one of the groups;
- determine a threshold for a difference between the number of the written chunks of data that are associated with a group, and the number of the written chunks of data associated with the neighboring groups;
- determine if the threshold for the difference between the number of chunks of data associated with a group and the number of chunks of data associated with the neighboring groups is exceeded; and
- in response to determining that the threshold is exceeded, adjust the boundaries of the groups, wherein each of the groups is associated with a similar number of the chunks of data.

13. The computer program product of claim 8, wherein recording metrics and converting absolute metrics to abstract metrics are retained in primary storage within a data structure.

14. The computer program product of claim 8, the program code further being readable/executable by a computer processor to:
- select a sample from the chunks of data associated with a group having a low affinity of deduplication;
- determine if the sample from the chunks of data is a duplicate; and
- in response to determining the sample from the chunks of data is a duplicate, send all the chunks of data associated with incoming writes of the sample, through deduplication.

15. A system comprising:
- one or more processors;
- one or more computer-readable memories;
- one or more computer-readable permanent storage subsystem(s);
- program code stored on the one or more computer-readable storage subsystems, for execution by at least one of the one or more processors via one of the one or more computer readable memories, the program code executable to:
  - receive a plurality of writes, each write comprised of chunks of data;
  - record metrics associated with the chunks of data from the plurality of writes;
  - generate groups based on the metrics, each of the chunks of data from the plurality of writes are associated with one of the groups, wherein a different portion of available ranges of the metrics is associated with each of the groups and each of the groups includes a similar number of the chunks of data;

determine a deduplication affinity for each of the groups based on a percentage of the chunks of data that align with each of the groups and a percentage of the chunks of data of each of the groups that are duplicates;

determine a threshold for the deduplication affinity of the groups; and in response to incoming chunks of data aligning with the groups that exceed the threshold for the deduplication affinity, exclude from deduplication the incoming chunks of data aligning with the groups that exceed the threshold.

16. The computer system of claim 15, wherein recording metrics associated with the chunks of data from the plurality of writes comprises recording an absolute overwrite score and recording an absolute sequentiality score, for each of the chunks of data from the plurality of writes.

17. The computer system of claim 16, wherein the absolute overwrite score and the absolute sequentiality score are converted to an abstract overwrite score and an abstract sequentiality score, respectively, based on a percentile of all the chunks of data from the plurality of writes having the absolute overwrite score and the absolute sequentiality score, and aligning the percentile to a group such that each group is associated with a similar number of chunks of data.

18. The computer system of claim 15, wherein the program instructions to generate groups:

perform deduplication on a statistically significant number of chunks of data to obtain a plurality of metric values;

convert the plurality of metric values of the chunks of data to abstract values based on computing a percentage of the plurality of metric values and a total number of written chunks of data; and define boundaries of the groups, wherein the boundaries are portions of a range of the abstract values and are associated with each of the groups, such that a similar number of chunks of data are associated with each of the groups.

19. The computer system of claim 18, wherein the program instructions:

define the boundaries that are between neighboring groups, wherein the boundaries of a group are continuous with the boundaries of the neighboring groups;

associate each of the chunks of data including abstract metric scores, to one of the groups based on the abstract metric scores of each of the chunks of data falling within the boundaries of one of the groups;

determine a threshold for a difference between the number of the written chunks of data that are associated with a group, and the number of the written chunks of data associated with the neighboring groups;

determine if the threshold for the difference between the number of chunks of data associated with a group and the number of chunks of data associated with the neighboring groups is exceeded; and in response to determining that the threshold is exceeded, adjust the boundaries of the groups, wherein each of the groups is associated with a similar number of the chunks of data.

20. The computer system of claim 15, wherein the program instructions:

select a sample from the chunks of data associated with a group having a low affinity of deduplication;

determine if the sample from the chunks of data is a duplicate; and in response to determining the sample from the chunks of data is a duplicate, send all the chunks of data associated with incoming writes of the sample, through deduplication.

* * * * *